Jan. 21, 1936. J. R. SURMANN 2,028,258

DEVICE FOR STORING EGGS OR THE LIKE

Filed July 30, 1934

J. R. Surmann
Inventor:
per Sydney E. Page.
Attorney.

Patented Jan. 21, 1936

2,028,258

UNITED STATES PATENT OFFICE 2,028,258

DEVICE FOR STORING EGGS OR THE LIKE

Johannes Rudolph Surmann, Berlin-Schlachtensee, Germany

Application July 30, 1934, Serial No. 737,625
In Germany August 2, 1933

12 Claims. (Cl. 217—27)

The invention relates to a device for storing eggs or the like and consists of a pasteboard or other intermediate layer from which a part is so separated by incisions that it remains so connected to the pasteboard or the like by supporting stays and is pressed downwardly by the point of the egg to such an extent as the egg enters the openings formed by the incisions, whilst the egg is protected at the bottom by the part of the pasteboard located between the incisions and laterally by the supporting stays which connect the middle portion of the pasteboard to the surrounding rim.

In the accompanying drawing is illustrated an example of construction of the invention.

Figure 1:
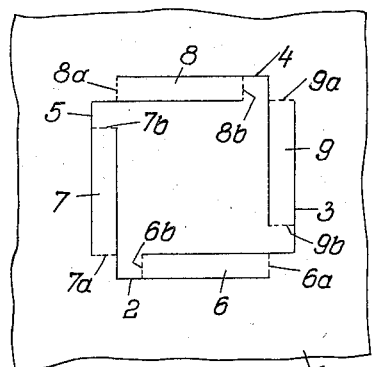
Fig. 1 is a sheet of pasteboard with the incisions, whilst the middle part of the pasteboard is still in the same plane as the actual pasteboard.

In the example of construction there are provided in the pasteboard 1 four angular incisions 2, 3, 4, 5, whereby there are formed between the limbs, for example, the incision 2 and one limb of the incision 3 or 5, bands or supporting stays 6, 7 and correspondingly further bands 8, 9, which are connected, for example at the left hand end, looking in a clockwise direction at the dotted lines 6a, 7a, 8a, 9a to the pasteboard 1 and at their right hand ends at the dotted lines 6b, 7b, 8b, 9b, to the inner pasteboard part 10. The lines 6a, 7a, 8a, 9a and 6b, 7b, 8b, 9b may be so prepared by scoring or impression that at these points the supporting bands 6, 7, 8, 9 can be bent easily relatively to the pasteboard parts 1 and 10.

Figure 2:
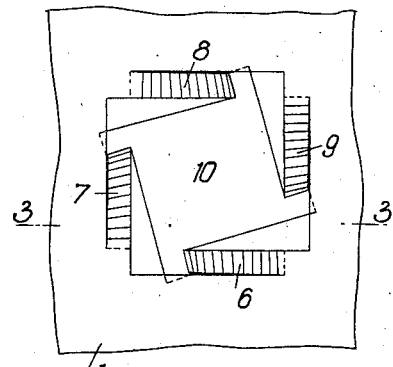
Fig. 2 shows a plan in which the middle part has been pressed downwardly.
Figure 3:
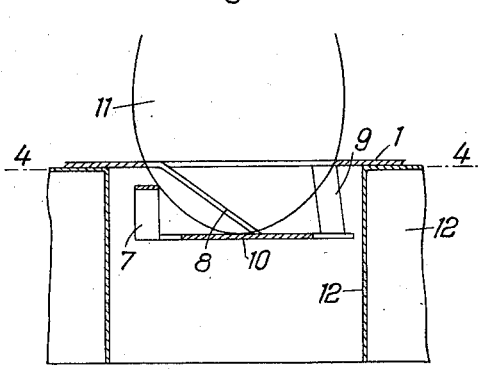
Fig. 3 is a section on the line 3—3 of Fig. 2.

When pressure is applied to the pasteboard part 10, this sinks as the bands 6, 7, 8, and 9 yield, the pasteboard part 10 turning as shown in Fig. 2. When, for example, as shown in Fig. 3, an egg 11 is placed into the opening shown in Fig. 4, the egg bears against the middle of the sides a, b, c, d and against the corners e, f, g, h, as shown by the broken line circle i in Fig. 4 and thus presses with its point against the part 10, which whilst simultaneously by bending the supporting bands 6, 7, 8, 9, and turning sinks. In this manner the egg is supported both at the bottom, and also by the supporting bands 6, 7, 8, 9 on all four sides.

Figure 4:
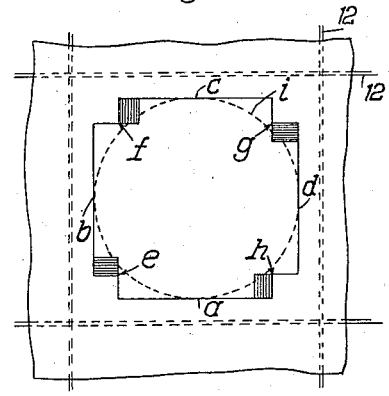
Fig. 4 is a section on the line 4—4 of Fig. 3.

The pasteboard sheets 1 obtained by the incisions may for example, be inserted between the known spacing partitions 12, shown in broken lines in Fig. 4, which are generally usual when packing eggs. The point of the egg thus passes through the surface of the pasteboard 1 and thus leaves sufficient space at the top to receive the point of the egg located next above and passing through its corresponding pasteboard.

The type of incisions and the number of supporting bands, as also the shape of the support 10 which remains, may be suitably modified. For example instead of the rectangular incisions there may be selected arcuate or otherwise curved incisions and instead of four incisions there may be two, three, five or more incisions so that there are correspondingly formed more or less supporting or stay bands.

In addition to eggs, these packing devices may also be used for other articles, for example, for metal or glass vessels or the like. The shape of the opening shown in Fig. 4 is preferably made to suit the cross section of the article to be packed and may, for example, in the case of triangular articles have a triangular shape and so forth. The pasteboard insertions 1 may be constructed of flat or even of corrugated pasteboard, or of any other material which can be prepared by cutting and enables the stay bands 6, 7, 8, 9 to be bent.

Figure 5:
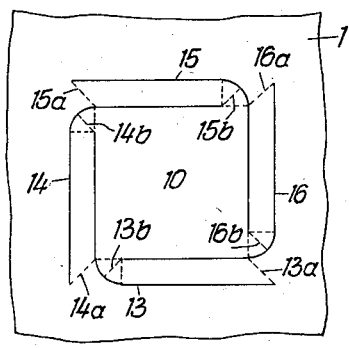
Figs. 5 and 6 show further forms of construction of incisions.

Fig. 5 shows incisions 13, 14, 15, 16, wherein the transitory part between the two limbs of the incisions which are at right angles to one another, are in the form of a quadrant, the scoring lines 13a, 14a, 15a, 16a extend at an angle for example, 45° to the limbs of the incisions 13 to 16. The scoring lines 13b, 14b, 15b, 16b are similarly arranged.

By rounding off the transitory arc there is obtained the result that the middle plate 10 in the lowered and thus turned position does not project beyond the full opening as is, for example, the case in the form of construction in Fig. 2 and by means of the inclined arrangement of the scoring or impressed lines the stay bands are not twisted as in the form of construction in Fig. 2.

Figure 6:
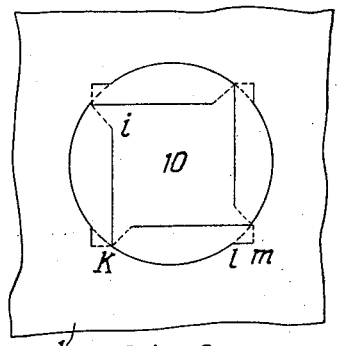

Fig. 6 shows incisions which between the points i and k are straight between k and l form parts of the periphery of a circle and between l and m are again straight. The supporting bands located between the lines i, k and the adjacent arcuate portions have the shape of sectors of a circle and the opening which is formed has the shape of a circle.

I claim:—

1. A device for use in packing eggs and so forth comprising a rim element of pasteboard, a single unitary supporting element located substantially centrally of said rim, and a plurality of stays connecting said rim to said supporting element.

2. A device for use in packing eggs and so forth comprising a sheet of pasteboard, said sheet having a plurality of pairs of outer and inner incisions, the inner incision of each pair of incisions being connected to the outer incision of the next pair.

3. A device of the character described comprising a sheet of pasteboard having a plurality of pairs of outer and inner incisions therein, the ends of said incisions being relatively displaced, the inner incision of each pair of incisions being connected to the outer incision of the next pair.

4. A device of the character described comprising a sheet of pasteboard having a plurality of pairs of outer and inner incisions therein, the ends of said incisions being relatively displaced, said pairs of incisions being arranged at right angles to one another, the inner incision of each pair of incisions being connected to the outer incision of the next pair.

5. In combination with partitions of a supporting device adapted to be fitted between said partitions, said supporting device comprising a rim element, a single centrally located supporting element and a plurality of stays, between the rim element and the supporting element.

6. A device of the character described comprising a sheet of pasteboard having four incisions therein, each of said incisions consisting of two limbs arranged at right angles to one another, one limb of one incision being located parallel to a limb of another incision and spaced therefrom.

7. A device of the character described comprising a sheet of pasteboard having four incisions therein, each of said incisions consisting of two limbs arranged at right angles to one another, one limb of one incision being located parallel to a limb of another incision and spaced therefrom, and arcuate incisions connecting together each pair of limbs to form said incisions.

8. A device of the character described comprising a sheet of pasteboard having four incisions therein, each of said incisions consisting of two limbs arranged at right angles to one another, one limb of one incision being located parallel to a limb of another incision and spaced therefrom, and scoring lines extending from the ends of each of said incisions to the adjacent limb of another incision.

9. A device of the character described comprising a sheet of pasteboard having four incisions therein, each of said incisions consisting of two limbs arranged at right angles to one another, one limb of one incision being located parallel to a limb of another incision and spaced therefrom, and scoring lines extending from the ends of each incision to the adjacent limb of another incision, said scoring lines being at right angles to the incisions and limbs between which they extend.

10. A device of the character described comprising a sheet of pasteboard having four incisions therein, each of said incisions consisting of two limbs arranged at right angles to one another, one limb of one incision being located parallel to a limb of another incision and spaced therefrom, and scoring lines extending from the ends of each of said incisions to the adjacent limbs, some of said scoring lines being located at an angle to the incisions and limbs between which they extend, others of said scoring lines being at right angles to the incisions and limbs between which they extend, and others of said scoring lines being in alignment with the limbs.

11. A device of the character described comprising a sheet of material having four right angled incisions therein, one limb of one incision being parallel to a limb of another incision and spaced therefrom, the end of one limb extending beyond the end of the adjacent limb, and scoring lines extending at right angles from the end of each limb to the adjacent limb.

12. A device of the character described comprising four incisions therein, each of said incisions consisting of a straight limb and an arcuate limb, the straight limbs being located at right angles to one another, whilst said arcuate limbs are located in a circle, a straight portion of incision extending from the free end of each arcuate limb, circular scoring lines extending between the arcuate limbs, scoring lines extending from the end of one straight limb to the junction point between a straight limb and its corresponding arcuate limb, and scoring lines extending from each of said junction points to the ends of the straight portions.

JOHANNES RUDOLPH SURMANN.